(12) United States Patent
Tatsuno et al.

(10) Patent No.: US 7,886,862 B2
(45) Date of Patent: Feb. 15, 2011

(54) PRIME MOVER CONTROL DEVICE OF CONSTRUCTION MACHINE

(75) Inventors: Yukihiro Tatsuno, Tsukuba (JP); Hidetoshi Satake, Ishioka (JP); Kazuhiro Ichimura, Niihari-gun (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 1700 days.

(21) Appl. No.: 10/528,485

(22) PCT Filed: Sep. 26, 2002

(86) PCT No.: PCT/JP02/09964
§ 371 (c)(1), (2), (4) Date: Mar. 21, 2005

(87) PCT Pub. No.: WO2004/029434
PCT Pub. Date: Apr. 8, 2004

(65) Prior Publication Data
US 2006/0151230 A1    Jul. 13, 2006

(51) Int. Cl.
*B60K 17/00* (2006.01)
(52) U.S. Cl. ........................ 180/306; 180/900
(58) Field of Classification Search ............ 180/53.2, 180/53.4, 305, 306, 307, 308, 243, 315, 321, 180/900
See application file for complete search history.

(56) References Cited

U.S. PATENT DOCUMENTS

| | | | | |
|---|---|---|---|---|
| 3,595,343 A | * | 7/1971 | Williamson | 187/224 |
| 3,827,522 A | * | 8/1974 | Krause | 180/306 |
| 3,841,423 A | * | 10/1974 | Holtkamp et al. | 180/6.3 |
| 4,675,827 A | | 6/1987 | Narita et al. | |
| 5,155,996 A | | 10/1992 | Tatsumi et al. | |
| 5,277,269 A | * | 1/1994 | Ichimura et al. | 180/306 |

(Continued)

FOREIGN PATENT DOCUMENTS

DE    100 57 085 A1    5/2001

(Continued)

*Primary Examiner*—J. Allen Shriver, II
*Assistant Examiner*—Bridget Avery
(74) *Attorney, Agent, or Firm*—Oliff & Berridge, PLC

(57) ABSTRACT

A prime mover control device of a construction machine includes a hydraulic pump (24) driven by a prime mover (10), an actuator (5) driven with pressure oil discharged from the hydraulic pump (24), and a control valve (25) that controls a flow of the pressure oil from the hydraulic pump (24) to the actuator (5) in response to an operation of a first operating member (22a). The prime mover control device includes a first set means (41) that sets a first set rotation speed Nt of the prime mover (10) according to the operation of the first operating member (22a), a second set means (43) that sets a second set rotation speed Nx of the prime mover (10) according to an operation of a second operating member (34), a selection member (35) that selects one of a first mode and a second mode, and a rotation speed control means (30, 13) that controls a prime mover rotation speed to match with a maximum value of the first set rotation speed Nt and the second set rotation speed Nx when the selection member (35) selects the first mode, and controls the prime mover rotation speed to match with the second set rotation speed Nx when the selection member (35) selects the second mode.

7 Claims, 8 Drawing Sheets

U.S. PATENT DOCUMENTS

| | | | |
|---|---|---|---|
| 5,638,677 A | 6/1997 | Hosono et al. | |
| 6,182,448 B1 | 2/2001 | Ohkura et al. | |
| 6,582,340 B1 | 6/2003 | Arie et al. | |
| 6,938,719 B2 * | 9/2005 | Ishimaru et al. | 180/305 |

FOREIGN PATENT DOCUMENTS

| | | |
|---|---|---|
| EP | 0 765 970 A2 | 4/1997 |
| EP | 1 178 158 A1 | 2/2002 |
| JP | A-02-272117 | 11/1990 |
| JP | U 3-110150 | 12/1991 |
| JP | A 4-143428 | 5/1992 |
| JP | A-05-248406 | 9/1993 |
| JP | A-07-027106 | 1/1995 |
| JP | A 09-088650 | 3/1997 |
| JP | B2 2634330 | 4/1997 |
| JP | A 10-89111 | 4/1998 |
| JP | A 10-273919 | 10/1998 |
| JP | B2 2904854 | 3/1999 |
| JP | A 2000-92949 | 4/2000 |
| JP | A 2000-179372 | 6/2000 |
| JP | A-2002-003154 | 1/2002 |
| JP | A 2002-130003 | 5/2002 |
| JP | A 2003-269205 | 9/2003 |
| WO | WO98/06936 A1 | 2/1998 |

* cited by examiner

PRIME MOVER CONTROL DEVICE OF CONSTRUCTION MACHINE

TECHNICAL FIELD

The present invention relates to a prime mover control device of a construction machine that is capable of changing a rotation speed of a prime mover in accordance with an operation amount.

BACKGROUND ART

Control devices of this type known in the related art include the one disclosed in Japanese Patent Registration No. 2634330.

The device disclosed in this publication sets a rotation speed according to an operation amount of a rotation speed setting unit (a fuel lever) and a rotation speed according to an extent to which a travel pedal is operated, and selects a maximum value as a target rotation speed. As a result, a lowest value of the target rotation speed is restricted to a rotation speed in correspondence to an operation amount of the rotation speed setting unit so that if a rotation speed setting is set by the rotation speed setting unit to a value suitable for working (e.g., excavation), it is possible to minimize a fluctuation in the engine rotation speed and to improve the operability. Moreover, by setting the rotation speed setting at the rotation speed setting unit to the idling rotation speed during traveling, the prime mover rotation speed changes in accordance with the operation amount of the travel pedal, and thus the improvement of the fuel efficiency and the noise reduction can be achieved.

When utilizing the device disclosed in the above mentioned publication, it is necessary to maintain the travel pedal at a position depressed halfway down in order for a vehicle, for example, to travel at a constant speed since the traveling speed of the vehicle is adjusted by adjusting the operation amount of the travel pedal. However, it is a burden on an operator to keep the travel pedal at the halfway-down position.

DISCLOSURE OF THE INVENTION

An object of the present invention is to provide a prime mover control device of a construction machine with which a traveling speed can be adjusted with ease.

The present invention is adopted in a construction machine having a hydraulic pump driven by a prime mover, an actuator driven with pressure oil discharged from the hydraulic pump, and a control valve that controls a flow of the pressure oil from the hydraulic pump to the actuator in response to an operation of a first operating member. The prime mover control device includes a first set means for setting a first set rotation speed of the prime mover according to the operation of the first operating member, a second set means for setting a second set rotation speed of the prime mover according to an operation of a second operating member, a selection member that selects one of a first mode and a second mode, and a rotation speed control means for controlling a prime mover rotation speed to match with a maximum value between the first set rotation speed and the second set rotation speed when the selection member selects the first mode, and for controlling the prime mover rotation speed to match with the second set rotation speed when the selection member selects the second mode.

Another prime mover control device of the construction machine according to the present invention includes a first set means for setting a first set rotation speed of the prime mover according to the operation of the first operating member, a second set means for setting a second set rotation speed of the prime mover according to an operation of a second operating member, a selection member that selects one of a first mode and a second mode, and a rotation speed control means for controlling a prime mover rotation speed to match with the first set rotation speed when the selection member selects the first mode, and for controlling the prime mover rotation speed to match with the second set rotation speed when the selection member selects the second mode.

Accordingly, since the drive speed of the actuator can be changed in accordance with the operation amount of the second operating member while the first operating member is operated to the maximum extent in the second mode, the speed of the actuator can be adjusted with ease.

It is preferable that the first operating member is a foot-operated operating member, and the second operating member is a hand-operated operating member.

It is preferable that the selection member is installed in the vicinity of the second operating member. The actuator may be a traveling motor.

When the traveling state is determined by determining whether the traveling state or work state, the first set rotation speed may be set to a larger value compared to a value to be set when the work state is determined. The traveling state may be determined when the non-operating state of the brake and the neutral operation are detected.

The present invention is ideal in an application in a wheeled hydraulic excavator.

BEST MODE FOR CARRYING OUT THE INVENTION

The first embodiment achieved by adopting a prime mover control device according to the present invention in a wheeled hydraulic excavator is explained in reference to FIGS. 1 through 6.

Figure 1:
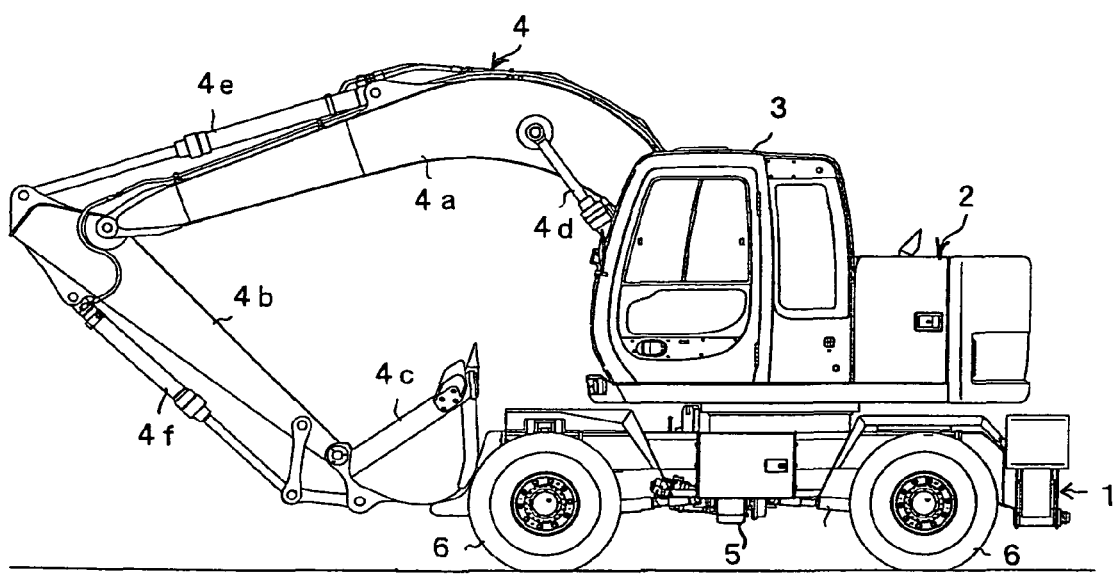
FIG. 1 is an external view of a wheeled hydraulic excavator in which the present invention is adopted.

As shown in FIG. 1, the wheeled hydraulic excavator includes an undercarriage 1 and a revolving superstructure 2 rotatably mounted atop the undercarriage 1. An operator's cab 3 and a work front attachment 4 constituted with a boom 4a, an arm 4b and a bucket 4c are provided at the revolving superstructure 2. The boom 4a is raised/lowered as a boom cylinder 4d is driven, the arm 4b is raised/lowered as an arm cylinder 4e is driven and the bucket 4c is engaged in a dig/dump operation as a bucket cylinder 4f is driven. A traveling motor 5, which is hydraulically driven, is provided at the undercarriage 1, and the rotation of the traveling motor 5 is transmitted to wheels 6 (tires) via a drive shaft and an axle.

Figure 2:
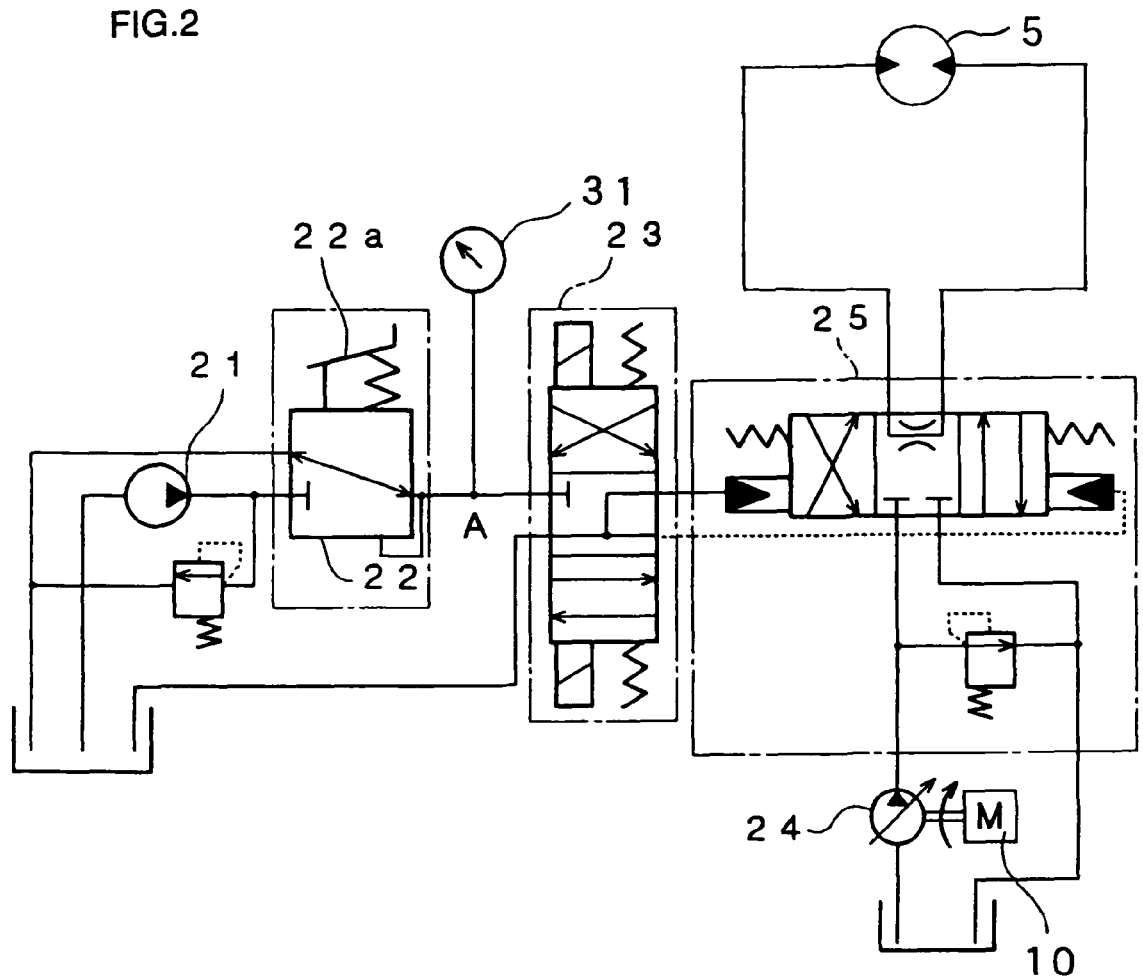
FIG. 2 is a circuit diagram of a hydraulic circuit for traveling in the wheeled hydraulic excavator in FIG. 1.

FIG. 2 is a circuit diagram of a traveling hydraulic circuit in the wheeled hydraulic excavator shown in FIG. 1. This hydraulic circuit includes a main pump 24 driven by a prime mover 10, the traveling motor 5 driven with pressure oil form the main pump 24, a control valve 25 that controls a flow of the pressure oil from the main pump 24 to the traveling motor 5, a pilot pump 21, a pilot valve 22 driven via a foot-operated travel pedal 22a, and a forward/backward switching valve 23 that is switched to a forward position, a backward position or a neutral position in response to an operation of a forward/backward selector switch (not shown).

As the forward/backward switching valve 23 is set to the forward position or the backward position through a switch operation and then the travel pedal 22a is operated, a pilot pressure originating from the pilot pump 21 is applied to the control valve 25. In response, the pressure oil from the main pump 24 is applied to the traveling motor 5 via the control valve 25 and the traveling motor 5 rotates, thereby causing the vehicle to travel forward or backward. A pressure sensor 31 is connected to the pilot valve 22 and a pilot pressure Pt is detected as a travel command with the pressure sensor 31.

Figure 3:
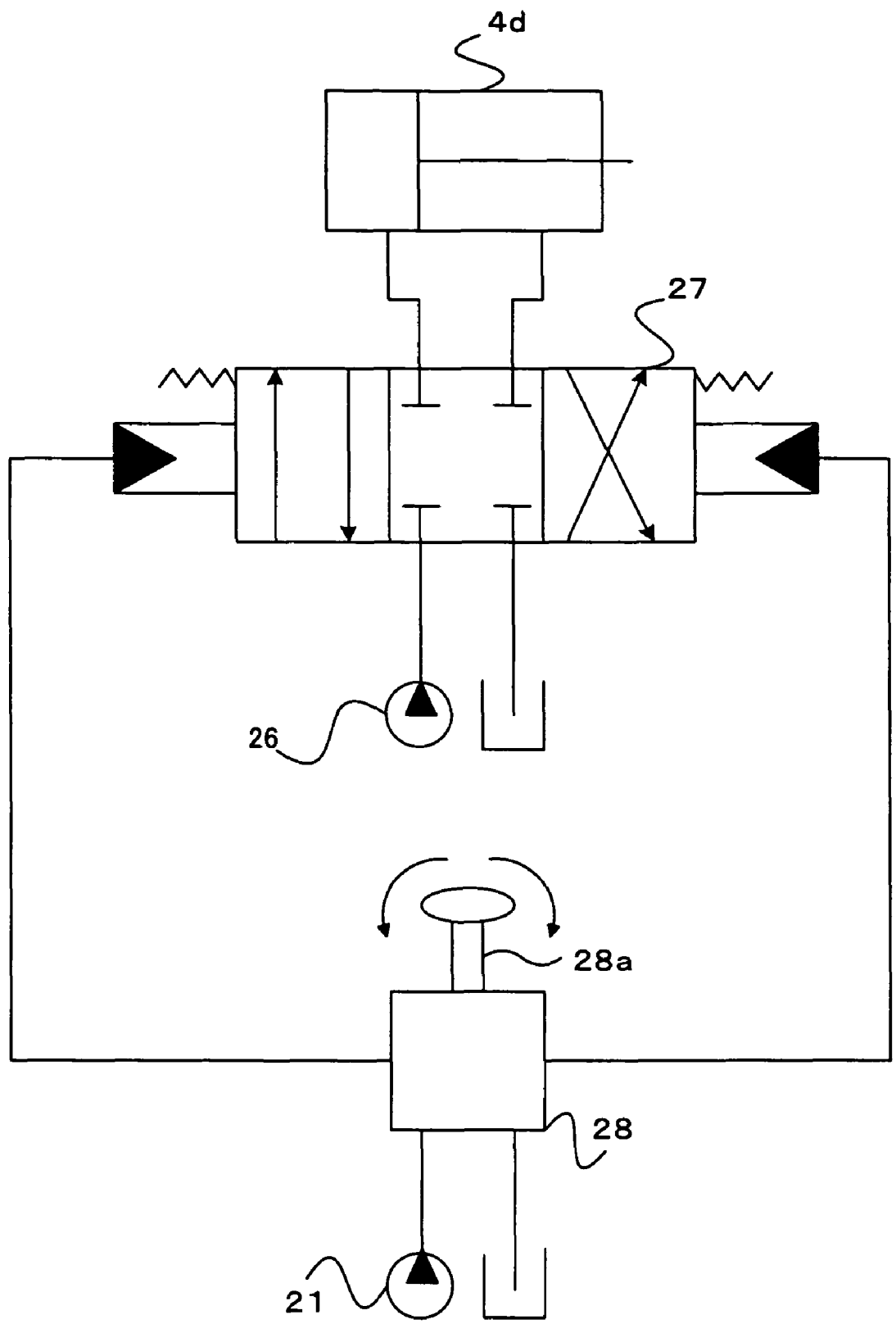
FIG. 3 is a circuit diagram of a work hydraulic circuit in the wheeled hydraulic excavator in FIG. 1.

FIG. 3 shows a hydraulic circuit for the boom cylinder, representing an example of a work hydraulic circuit. This hydraulic circuit includes a main pump 26, the boom cylinder 4d that is caused to extend/contract by pressure oil from the main pump 26, a control valve 27 that controls the flow of the pressure oil from the main pump 26 to the boom cylinder 4d, the pilot pump 21 and a pilot valve 28 driven via an operating lever 28a. It is to be noted that although not shown, hydraulic circuits of the other actuators for actuating the front attachment are similar to that described above.

In response to an operation of the operating lever 28a, the pilot valve 28 is driven in correspondence to the extent to which the operating lever 28a has been operated and a pilot pressure from the pilot pump 21 is applied to the control valve 27. As a result, the pressure oil from the main pump 26 is guided to the boom cylinder 4d via the control valve 27 and, as the boom cylinder 4d extends/contracts, the boom 4a is raised/lowered. It is to be noted that the hydraulic circuit may dispense with the main pump 26 and, in such a case, the cylinder 4d can be driven with the pressure oil from the main pump 24.

In this embodiment, the engine rotation speed is controlled to adjust a delivery flow rate from the pump in a pedal mode (a first mode) or in a dial mode (a second mode) to be detailed later, so as to adjust the vehicle speed.

Figure 4:
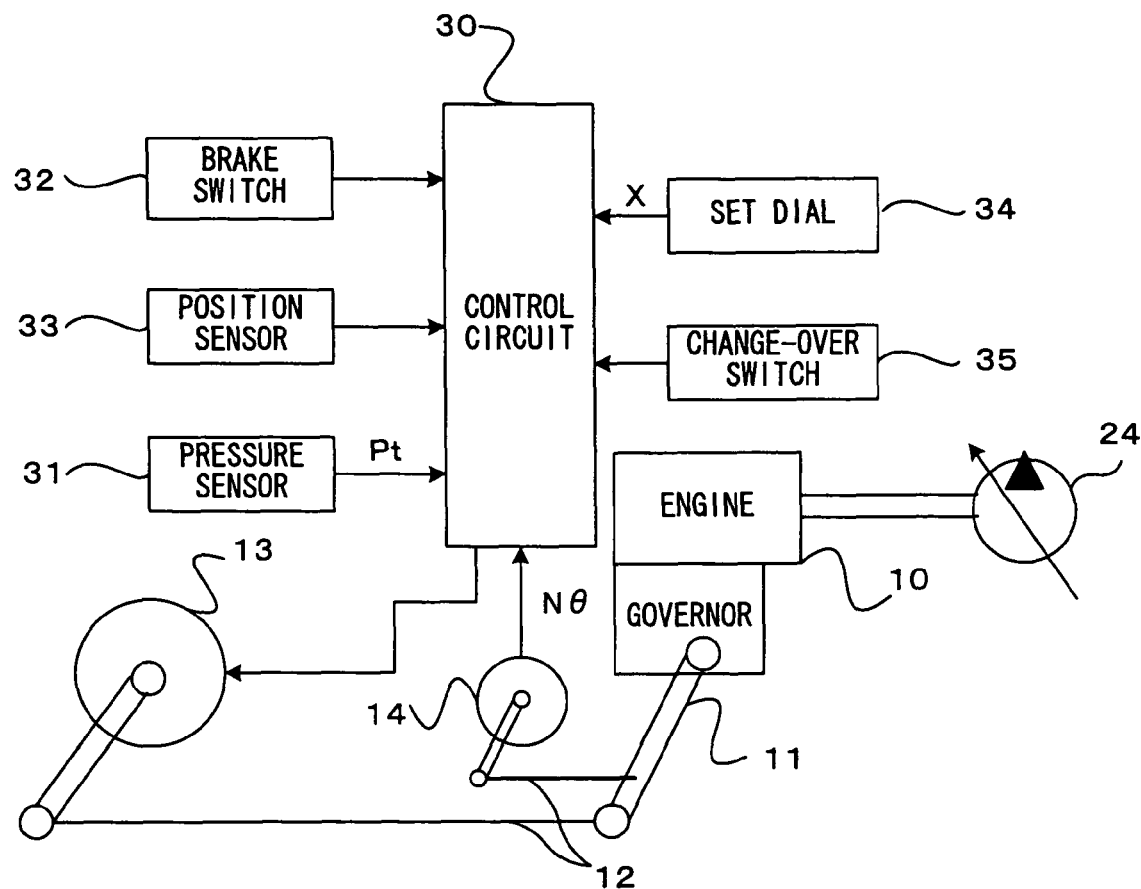
FIG. 4 is a block diagram of a prime mover control device achieved in an embodiment of the present invention.

FIG. 4 is a block diagram of a control circuit that controls the rotation speed of the engine. A governor lever 11 of an engine 10 is connected to a pulse motor 13 via a link mechanism 12 and the engine rotation speed is adjusted with the rotation of the pulse motor 13. Namely, the engine rotation speed increases as the pulse motor 13 rotates forward, and the engine rotation speed decreases with a reverse rotation of the pulse motor 13. A potentiometer 14 is connected to the governor lever 11 via the link mechanism 12, and the governor lever angle corresponding to the rotation speed of the engine 10, which is detected with the potentiometer 14, is input to the control circuit 30 as an engine control rotation speed Nθ.

The control circuit 30 is connected with the pressure sensor 31 that detects the pilot pressure Pt corresponding to the extent to which the travel pedal 22a is operated, a brake switch 32, a position sensor 33 that detects the position to which the forward/backward switching valve 23 is switched, a manual or hand-operated set dial 34 that issues a signal for setting the engine rotation speed in accordance with an extent X to which the dial is turned, and a change-over switch 35 that changes over between the pedal mode and the dial mode selectively.

As the brake switch 32 is switched to a traveling position, a work position or a parking position, a work or traveling signal is output from the brake switch 32. When the brake switch 32 is switched to the traveling position, a parking brake is canceled and the operation of a service brake is enabled through a brake pedal. As the brake switch 32 is switched to the work position, the parking brake and the service brake are both engaged. When it is switched to the parking position, the parking brake is engaged. As the brake switch 32 is switched to the traveling position, it outputs an off signal, whereas it outputs an on signal when it is switched to the work or parking position.

Figure 7:
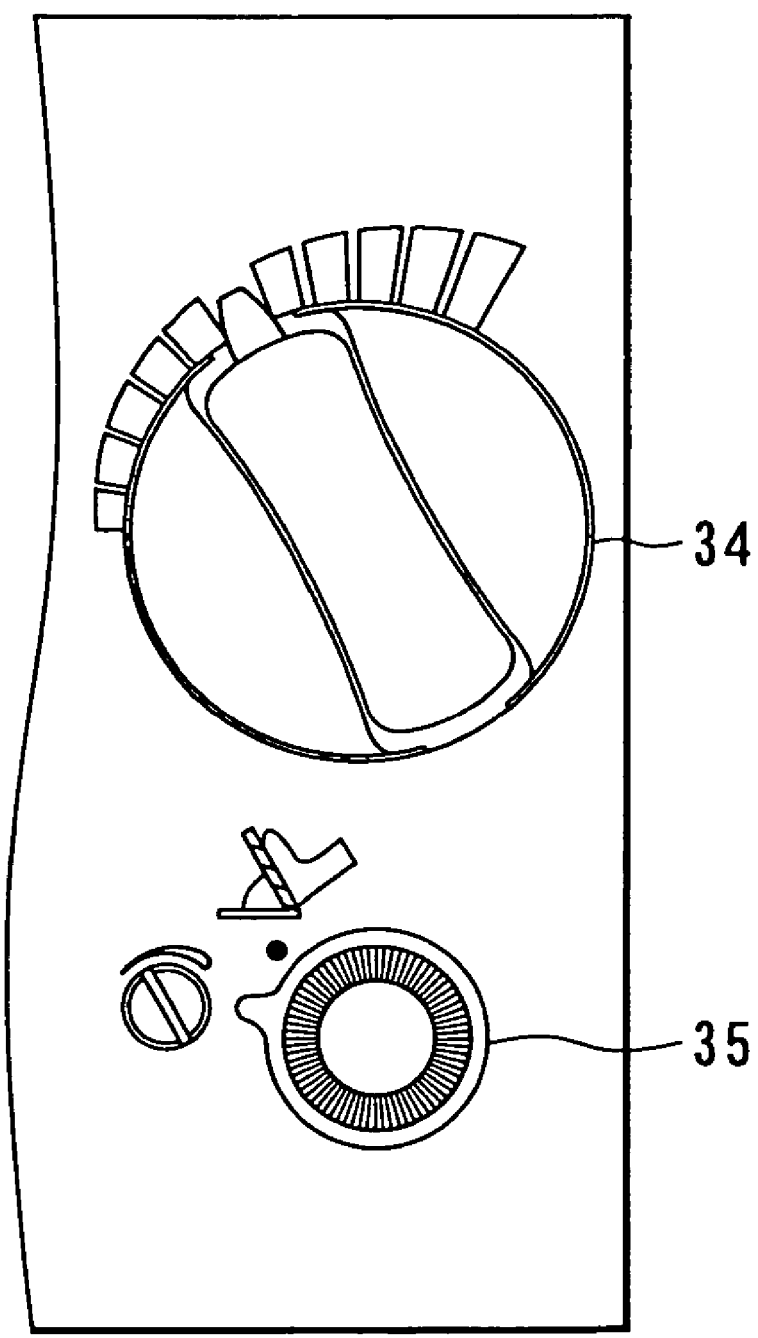
FIG. 7 shows one example of arrangement of a set dial and a change-over switch.

The set dial 34 is installed in an operation panel in the vicinity of an operator's seat so as to be operatable during traveling. The change-over switch 35 is disposed adjacent to the set dial 34 so as to enable the operator to operate the change-over switch 35 without leaving his hand from the set dial 34. One example of arrangement of the set dial 34 and the change-over switch 35 is shown in FIG. 7.

The rotation speed control circuit 30 executes the following arithmetic operation and outputs a control signal to the pulse motor 13.

Figure 5:
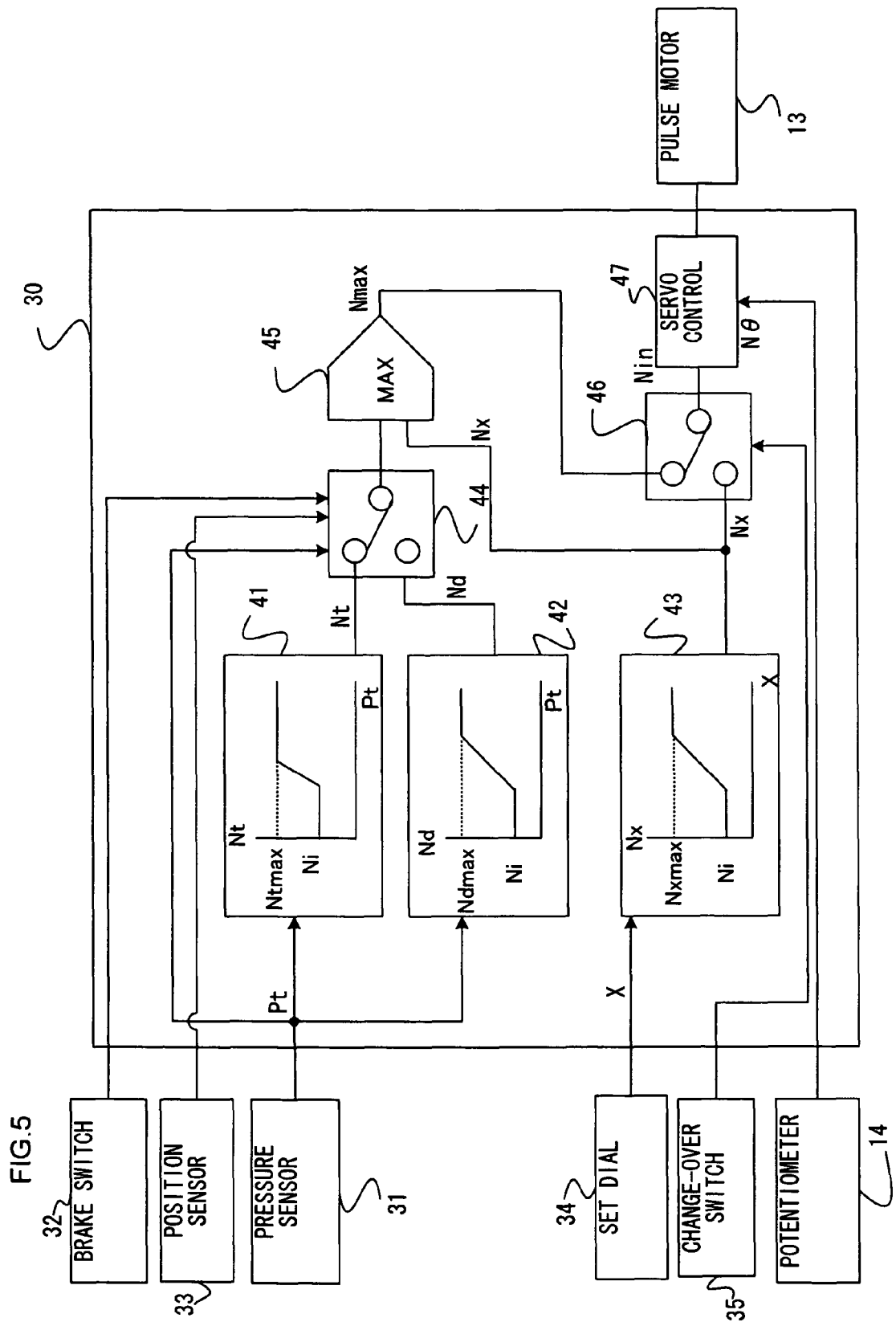
FIG. 5 shows in detail a control circuit in FIG. 4.

FIG. 5 is a conceptual diagram illustrating in detail the rotation speed control circuit 30. The relationships between the detection value Pt provided by the pressure sensor 31 and a target rotation speed Nt and between the detection value Pt and a target rotation speed Nd are stored in memory in advance at rotation speed calculation units 41 and 42 respectively as shown in the figure, and the target rotation speeds Nt and Nd matching the extent to which the travel pedal 22a is operated are individually calculated based upon the characteristics of these relationships. It is to be noted that the characteristics stored in memory at the rotation speed calculation unit 41 are the characteristics suited for traveling, whereas the characteristics stored in memory at the rotation speed calculation unit 42 are the characteristics suited for work performed by using the work attachment 4. These characteristics indicate linear increases in the target rotation speeds Nt and Nd from the idling rotation speed Ni as the extent of pedal operation increases. The target rotation speed Nt increases in a steeper slope compared to the target rotation speed Nd, and a maximum value Ntmax of the target rotation speed Nt is greater than a maximum value Ndmax of the target rotation speed Nd.

As shown in the figure, the relationship between the extent X to which the set dial 34 is operated and a target rotation speed (rotation speed setting) Nx is stored in memory in advance at a rotation speed calculation unit 43 as shown in the figure, and the target rotation speed Nx corresponding to the dial operation extent X is calculated based upon the characteristics of the relationship. It is to be noted that a maximum value Nxmax of the target rotation speed Nx is set equal to the maximum value Ndmax at the rotation speed calculation unit 42 (Nxmax=Ndmax).

A selection unit 44 selects one of the target rotation speeds Nt and Nd provided by the rotation speed calculation units 41 and 42, based upon the signals provided from the brake switch 32, the position sensor 33 and the pressure sensor 31. If the brake switch 32 has been switched to the traveling position (an off signal is output), the forward/backward switching valve 23 is set at a position other than the neutral position and the pilot pressure Pt representing the extent of the operation of the travel pedal 22a is equal to or greater than a predetermined value, i.e., if the vehicle is traveling, the target rotation speed Nt is selected, and the target rotation speed Nd is selected otherwise, i.e., under non-traveling conditions.

A maximum value selection unit 45 compares the target rotation speed Nt or Nd selected by the selection unit 44 with the target rotation speed Nx calculated at the rotation speed calculation unit 43 and selects the larger value as Nmax.

A mode change unit 46 selects either the target rotation speed Nmax selected at the maximum value selection unit 45 or the target rotation speed Nx calculated at the rotation speed calculation unit 43, based upon the signal provided from the change-over switch 35. The target rotation speed Nmax is selected when the change-over switch 35 is switched to the pedal mode, and the target rotation speed Nx is selected when the change-over switch 35 is switched to the dial mode.

A servo control unit 47 compares the rotation speed (the rotation speed command value Nin) selected at the mode change unit 46 with the control rotation speed Nθ corresponding to the displacement quantity of the governor lever 11 detected with the potentiometer 14. Then, it controls the pulse motor 13 through the procedure shown in FIG. 6 so as to match the two values.

Figure 6:
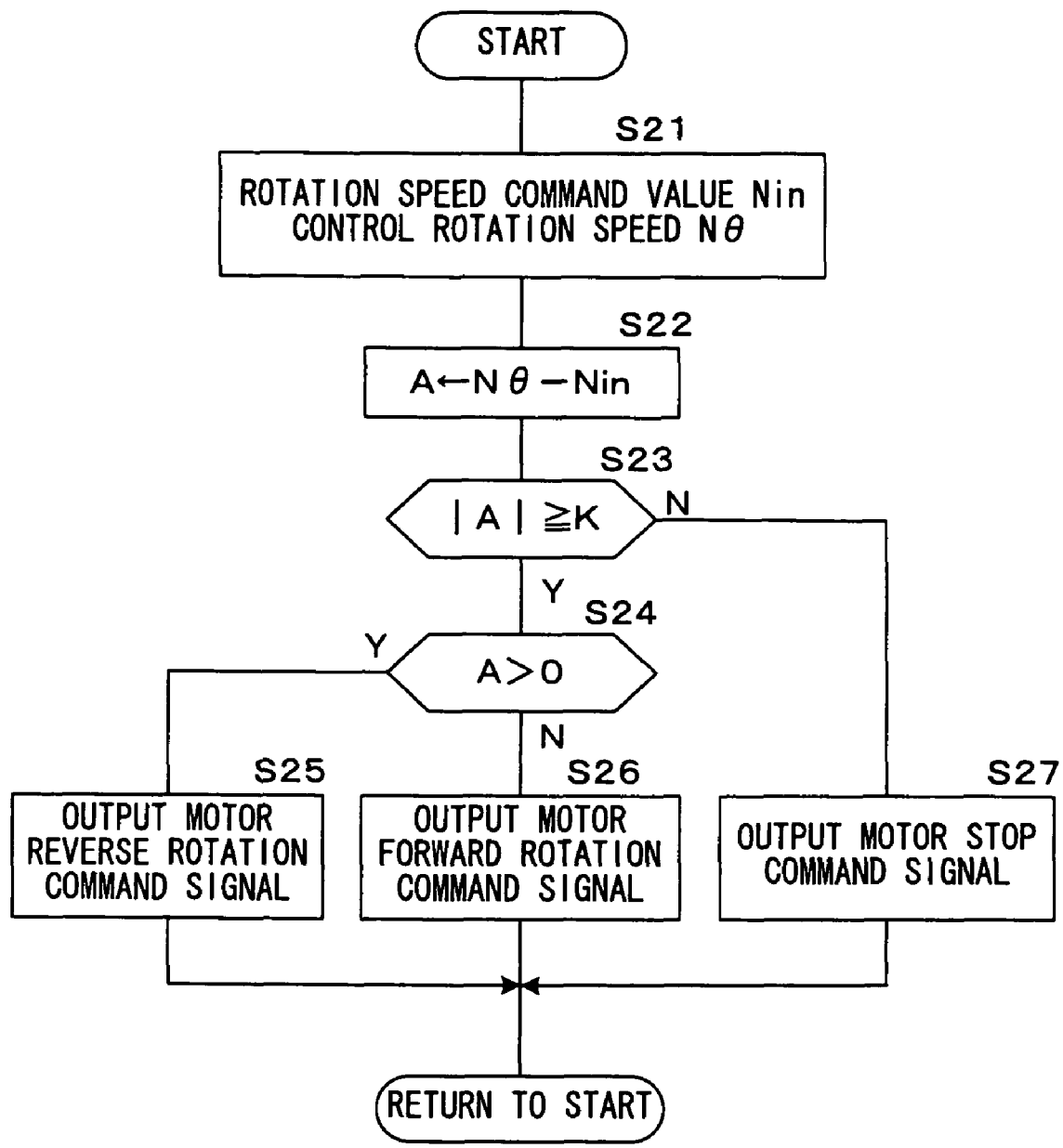
FIG. 6 presents a flow chart a procedure for controlling the engine rotation speed.

First, the rotation speed command value Nin and the control rotation speed Nθ are individually read in step S21 before proceeding to step S22 in FIG. 6. Then, in step S22, the results of subtracting Nin from Nθ are stored as a rotation speed difference A in memory, and in step S23, a decision is made as to whether or not $|A| \geqq K$ is true with regard to the rotation speed difference A and a predetermined reference rotation speed difference K. If an affirmative decision is made, the operation proceeds to step S24 to decide whether or not the rotation speed difference A is greater than 0. If A>0, the control rotation speed Nθ is greater than the rotation speed command value Nin, i.e., the control rotation speed is higher than the target rotation speed and, accordingly, a signal constituting a command for a motor reverse rotation is output to the pulse motor 13 in step S25 in order to lower the engine rotation speed. In response, the pulse motor 13 rotates in the reverse direction, thereby lowering the engine rotation speed.

If, on the other hand, $A \leqq 0$, the control rotation speed Nθ is lower than the rotation speed command value Nin, i.e., the control rotation speed is lower than the target rotation speed and, accordingly, a signal constituting a command for a motor forward rotation is output in step S26 in order to raise the engine rotation speed. In response, the pulse motor 13 rotates forward, thereby raising the engine rotation speed. If a negative decision is made in step S23, the operation proceeds to step S27 to output a motor stop signal and, as a result, the engine rotation speed is sustained at a constant level. Once the processing in one of steps S25 through S27 is executed, the operation returns to the start point.

Next, the operation that characterizes the prime mover control device achieved in this embodiment is explained.

(1) Pedal Mode

First, explanation is given in the case where the pedal mode is selected with the change-over switch 35. By selecting the pedal mode, the engine rotation speed can be set in accordance with the operation of the travel pedal 22a and thus, the pedal mode is suitable for a normal travel during which a maximum torque may be generated.

The brake switch 32 is set to the traveling position and the forward/backward selector switch is set to the forward position or the backward position when the vehicle is to travel. As the travel pedal 22a is depressed in this state, the control valve 25 is switched in correspondence to the extent of the pedal operation and the traveling motor 5 is caused to rotate by the pressure oil from the main pump 24.

At this time, the target rotation speed Nt is selected through the arithmetic operation in the selection unit 44 of the control circuit 30, and the target rotation speed Nt is again selected in the maximum value selection unit 45. Thus, the target rotation speed Nt is set as the rotation speed command value Nin, and with the signal outputted through the servo control to the pulse motor 13, control is implemented to set the engine rotation speed equal to the target rotation speed Nt. In this situation, the engine rotation speed is adjusted in conformance to the characteristics suitable for traveling stored in memory at the rotation speed calculation unit 41. As a result, an improvement in fuel efficiency and the noise reduction can be achieved as well as achieving desirable acceleration.

To engage the vehicle in work in a state where the vehicle remains stopping, the brake switch 32 is set to the work position and the forward/backward selector switch is set to the neutral position. As the operating lever 28a is operated in this state, the control valve 27 is switched in correspondence to the extent to which the operating lever 28a is operated, thereby driving the boom cylinder 4d.

At this time, based upon the arithmetic operation executed at the control circuit 30, the selection unit 44 selects the target rotation speed Nd and the maximum value selection unit 45 selects a larger value between the target rotation speed Nd and the target rotation speed Nx set by the set dial 34. Accordingly, by setting the target rotation speed Nx with the set dial 34 to a suitable value for the particular nature of work to be undertaken, a fluctuation of the engine rotation speed can be suppressed regardless of the operation of the travel pedal 22a and the excellent workability can be obtained.

(2) Dial Mode

Next, explanation is given in the case where the dial mode is selected with the change-over switch 35. In the dial mode, the engine rotation speed is set through the operation of the set dial 34 regardless of the operation of the travel pedal 22a, and the engine rotation speed is adjusted to the value set via the set dial 34 while no rotation speed is selected at the selection units 44 and 45 with reference to FIG. 5. In this mode, the engine rotation speed is set via the set dial 34 and when the travel pedal 22a is depressed, only an extent to which the control valve 25 is switched changes to adjust the speed without changing the engine rotation speed. Accordingly, by setting the engine rotation speed to, for example, a predetermined low rotation speed with the set dial 34, a speed based upon a maximum delivery flow rate of the main pump 24 corresponding to the set engine rotation speed can be set as a maximum speed, thereby making the dial mode suitable for a case where the travel speed should be limited below a predetermined level or for a case where the vehicle travels at a constant speed.

The target rotation speed Nx set via the set dial 34 is selected at the mode change unit 46 in the dial mode, and the target rotation speed Nx is set as the rotation speed command value Nin. As a result, the engine rotation speed is controlled to the target rotation speed Nx regardless of the operation of the travel pedal 22a. Namely, the delivery flow rate of the pump changes according to the extent to which the dial is turned.

Accordingly, when depressing the travel pedal 22a to the maximum extent, the pressure oil according to the target rotation speed Nx is supplied to the traveling motor 5 so as to enable the maximum speed of the vehicle to be regulated in accordance with the operation of the set dial 34. The maximum travel speed rises as the engine rotation speed increases due to increase in the extent to which the dial is operated, whereas the maximum travel speed is lowered as the engine rotation speed decreases due to decrease in the dial operation amount. In this manner, the vehicle can travel at a constant speed which is set at will while the travel pedal 22a is depressed to the maximum extent. As a result, there is no need for the operator to adjust the pedal operation amount, thereby reducing the burden on the operator.

According to this embodiment the following advantages can be achieved.

(1) The pedal mode or the dial mode is selected according to the operation of the change-over switch 35. The larger value between the target rotation speed Nt or Nd based upon the pedal operation and the target rotation speed Nx in accordance with the dial operation is selected in the pedal mode, whereas the target rotation speed Nx according to the dial operation is selected in the dial mode. Accordingly, in the dial mode the travel speed of the vehicle when the travel pedal 22a is depressed to the maximum extent is adjusted to the value in accordance with the extent X to which the dial is turned. As a result, the vehicle speed can be adjusted easily so as to allow the vehicle to travel at a constant speed with ease. In the pedal mode the maximum driving torque can be generated, thereby allowing the vehicle to travel at high speed with ease.

(2) The change-over switch 35 can be operated without releasing an operator's hand from the set dial 34 because the change-over switch 35 is installed in the vicinity of the set dial 34. As a result, constant speed travel and normal travel can be changed over immediately.

(3) The characteristics of the target rotation speed Nt for traveling and the target rotation speed Nd for working are set individually so that an inclination of increase in the target rotation speed Nt for traveling and the maximum rotation speed Ntmax are greater than an inclination of increase in target rotation speed Nd for working and a maximum value Ndmax, respectively. In this manner, excellent acceleration can be achieved during traveling in the pedal mode and the engine rotation speed can be adjusted easily during working since the inclination of the target rotation speed Nd for working is small.

(4) By detecting a state of traveling and a state of working with the brake switch 32 and the position sensor 33 and selecting the target rotation speed Nt or Nd based on the detection result, a special operation for selecting the target rotation speed is not necessary.

It is to be noted that while three target rotation speed calculation units 41 to 43 are provided in the above-described embodiment, the control circuit may dispense with the target rotation speed calculation unit 42. While the change-over switch 35 constitutes a selection means, an operation member other than the switch, for instance a dial may be used. While the set dial 34 constitutes a second set member, an operation member other than the dial, for instance a push button switch or a slide switch which moves straight may be used instead. While a travel state is determined based upon the signals from the brake switch 32 and the position sensor 33 working as a determination means, the travel state may be determined using, for instance a vehicle speed sensor.

Figure 8:
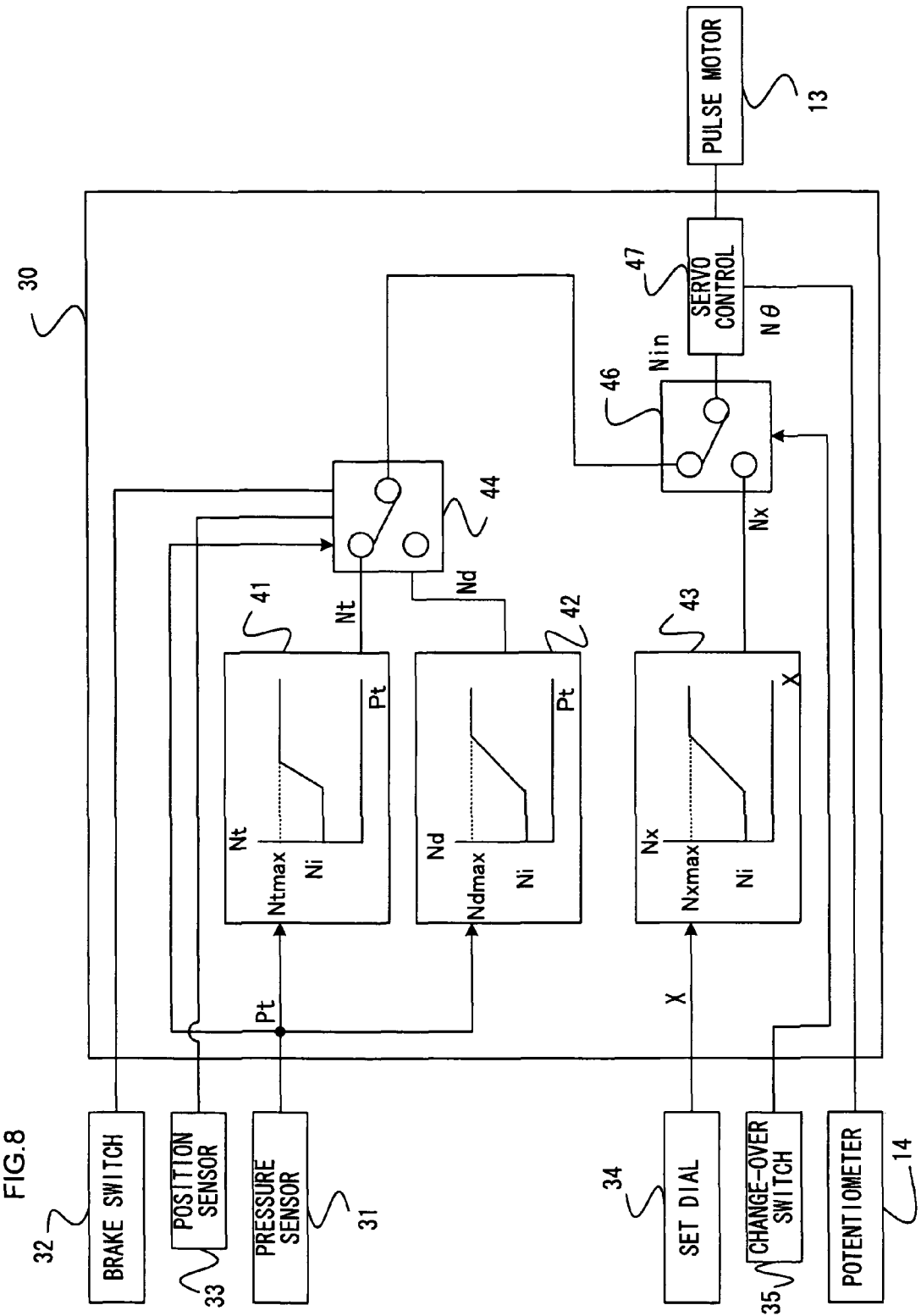
FIG. 8 shows a variation example of FIG. 5.

While, in the above embodiment, a maximum value of the target rotation speed Nt or Nd and the target rotation speed Nx is selected at the maximum value selection unit 45, the maximum value selection unit 45 may be omitted as shown in FIG. 8. In this manner, the engine rotation speed can be set in accordance with the operation of the travel pedal 22a regardless of the operation of the set dial 34 in the pedal mode, and the engine rotation speed can be set in accordance with the operation of the set dial 34 in the dial mode. That is, a separate engine control can be executed by using either the travel pedal 22a or the set dial 34.

While the explanation is given to an example that facilitates the speed adjustment of the traveling hydraulic motor 5 in the above, the present invention is not to be limited to this example and it may be applied to a revolving hydraulic motor that revolves the revolving superstructure, for example. A first operating member is also not limited to the travel pedal 22a.

INDUSTRIAL APPLICABILITY

While an explanation is given above on an example in which a wheeled hydraulic excavator represents an example of a construction machine in which the present invention may be adopted, the present invention may also be adopted in other types of construction machines such as non-wheel construction machines.

The invention claimed is:

1. A prime mover control device of a construction machine that includes:
    a hydraulic pump driven by a prime mover;
    an actuator driven with pressure oil discharged from the hydraulic pump; and
    a control valve that controls a flow of the pressure oil from the hydraulic pump to the actuator in response to an operation of a first operating member, comprising:
    a first set device that sets a first set rotation speed of the prime mover according to the operation of the first operating member;
    a second set device that sets a second set rotation speed of the prime mover according to an operation of a second operating member;
    a selection member that selects one of a first mode and a second mode, in the first mode a rotation speed of the prime mover is set according to either the operation of the first operating member or the operation of the second operating member, and in the second mode the rotation speed of the prime mover is set according to the operation of the second operating member regardless of the operation of the first operating member; and
    a rotation speed control device that controls the prime mover rotation speed to match with a maximum value between the first set rotation speed and the second set rotation speed when the selection member selects the first mode, and that controls the prime mover rotation speed to match with the second set rotation speed when the selection member selects the second mode.

2. A prime mover control device of a construction machine according to claim 1, wherein:
    the first operating member is a foot-operated operating member, and the second operating member is a hand-operated operating member.

3. A prime mover control device of a construction machine according to claim 1, wherein:
    the selection member is installed in the vicinity of the second operating member.

4. A prime mover control device of a construction machine according to claim 1, wherein:
    the actuator is a traveling motor.

5. A wheeled hydraulic excavator, comprising:
    a hydraulic pump driven by a prime mover;
    an actuator driven with pressure oil discharged from the hydraulic pump;

a control valve that controls a flow of the pressure oil from the hydraulic pump to the actuator in response to an operation of a first operating member; and a prime mover control device according to claim 1.

6. A prime mover control device of a construction machine according to claim 4, further comprising:

a determination device that determines a traveling state and a work state;

wherein:

when the traveling state is determined with the determination device, the first set device sets the first set rotation speed to a larger value compared to a value to be set when the work state is determined.

7. A prime mover control device of a construction machine according to claim 6, wherein:

the determination device comprises a brake detection unit that detects a non-operating state of a brake and a neutral detection unit that detects a neutral operation of the first operating member, and determines the traveling state when the non-operating state of the brake is detected and the neutral operation is not detected.

* * * * *